US008397832B2

(12) United States Patent
Blickle et al.

(10) Patent No.: US 8,397,832 B2
(45) Date of Patent: Mar. 19, 2013

(54) HAND TOOL MACHINE HAVING AN OSCILLATORY DRIVE

(75) Inventors: Juergen Blickle, Goeppingen (DE); Olaf Klabunde, Giengen (DE); Heinrich Weber, Schwaebisch Gmuend (DE)

(73) Assignee: C. & E. Fein GmbH (DE)

( * ) Notice: Subject to any disclaimer, the term of this patent is extended or adjusted under 35 U.S.C. 154(b) by 5 days.

(21) Appl. No.: 12/854,606

(22) Filed: Aug. 11, 2010

(65) Prior Publication Data

US 2011/0036609 A1 Feb. 17, 2011

(30) Foreign Application Priority Data

Aug. 11, 2009 (DE) ..................... 20 2009 011 312 U

(51) Int. Cl.
*B23B 45/16* (2006.01)
*B25D 9/00* (2006.01)
*B25D 11/00* (2006.01)
*B25D 13/00* (2006.01)
*B25D 16/00* (2006.01)

(52) U.S. Cl. ........................................ 173/109; 173/110

(58) Field of Classification Search .................. 173/100, 173/101, 110, 122, 126, 213, 109, 216; 451/356–357; 74/579 E, 579 R, 20–25
See application file for complete search history.

(56) References Cited

U.S. PATENT DOCUMENTS 3,147,548 A * 9/1964 Aspeek ........................... 30/169
3,319,874 A * 5/1967 Welsh ........................... 417/271
3,592,067 A * 7/1971 Hetzer .............................. 74/55
3,892,988 A * 7/1975 Gran ............................... 310/50
4,751,970 A * 6/1988 Hecker et al. ................. 173/104
5,193,281 A * 3/1993 Kasten ............................ 30/394
5,265,548 A * 11/1993 Satoma ......................... 112/254
5,533,925 A 7/1996 Sato
5,651,396 A * 7/1997 Yan et al. ....................... 139/449
5,833,524 A * 11/1998 Satoh et al. .................... 451/456
5,916,348 A * 6/1999 Lanfredi ........................... 92/71
6,138,549 A * 10/2000 Braun et al. ...................... 92/71
6,357,336 B1 * 3/2002 Wittmann et al. ................ 92/71
6,644,532 B2 * 11/2003 Green et al. ............... 227/176.1
2005/0126803 A1 6/2005 Zaiser
2009/0311952 A1 12/2009 Zaiser

FOREIGN PATENT DOCUMENTS

| | | | |
|---|---|---|---|
| DE | 8031084 | U1 | 6/1981 |
| DE | 3840974 | A1 | 6/1990 |
| DE | 4403538 | A1 | 8/1994 |
| DE | 10356068 | A1 | 6/2005 |
| EP | 1358965 | A2 | 11/2003 |
| JP | 8001471 | A | 1/1996 |
| WO | 2005102605 | A1 | 11/2005 |
| WO | 2008128804 | A1 | 10/2008 |

* cited by examiner

*Primary Examiner* — Robert Long
(74) *Attorney, Agent, or Firm* — St. Onge Steward Johnston & Reens LLC

(57) ABSTRACT

A hand tool is disclosed, comprising a housing, a motor shaft being coupled to a drive motor, a working spindle configured for being driven rotatingly oscillatingly about its longitudinal axis, and a coupling element being driven rotatingly by the motor shaft and having a closed guide surface that revolves around the motor shaft. The guide surface is coupled, via transmission means, to at least one driver for driving the latter. The at least one driver is arranged movably relative to the working spindle and engages the working spindle at a circumferential region thereof for driving the latter rotatingly oscillatingly.

14 Claims, 3 Drawing Sheets

HAND TOOL MACHINE HAVING AN OSCILLATORY DRIVE

CROSS REFERENCES TO RELATED APPLICATIONS

This application claims priority from German utility model application 202009011312.4, filed on Aug. 11, 2009. The entire contents of this priority application is incorporated herein by reference.

BACKGROUND OF THE INVENTION

The invention relates to a hand tool machine, having a housing, a motor shaft that is coupled to a drive motor, a working spindle that can be driven in a rotationally oscillating manner about its longitudinal axis, and a coupling element that can be driven rotationally by the motor shaft and has a closed guide surface that revolves about a guide axis, the guide surface being coupled, via transmission means, to at least one driver for the purpose of driving the latter.

Such hand tools are known in principle in the prior art, for example from DE 80 31 084 U1. In the hand tool known from this application, the rotation of a motor shaft generated by a motor is transmitted to an oscillating lever by means of an eccentric portion of the motor shaft. The oscillating lever is connected to a tool spindle in a rotationally fixed manner, such that a motion of the oscillating lever caused by the rotating eccentric portion results in a rotational oscillation of the tool spindle.

A transmission for generating a rotational oscillation can be configured in principle by means of such a design of an oscillation-driven hand tool.

An alternative drive for generating a rotational oscillation of a tool spindle in the case of a hand tool according to the type stated at the outset is known from DE 38 40 974 A1. In that case, a transmission lever is made to assume a wobbling motion by means of a wobble bearing driven in rotation by a motor. The transmission lever is coupled to the tool spindle by means of a sliding joint that intersects perpendicularly the longitudinal axis of a tool spindle. Owing to the wobbling motion of the transmission lever, the tool spindle, for its part, is then driven in a rotationally oscillating manner about its longitudinal axis. Since, in this case, the longitudinal axis of the tool spindle and an axis of a shaft that drives the wobble bearing are mounted at a fixed distance from one another, the transmission lever executes, relative to the longitudinal axis, a sliding motion along the sliding joint in addition to the swivelling at the same frequency. Moreover, the wobble bearing is held so as to be axially displaceable along a shaft profile of its drive shaft, in order to be able to assume, according to the turning and sliding motion of the transmission lever through and about the longitudinal axis of the tool spindle, an axial position on the drive shaft that is force-coupled to this motion.

A rotational oscillation of a tool spindle can, in principle, be effected in an alternative manner by means of such a hand tool, but only with a large number of parts and with a large amount of structural space being required, determined by the position of the elements in relation to one another, which is disadvantageous for hand tools of the type stated at the outset. The large structural space requirement is caused, in particular, by the fact that the shaft for driving the wobble bearing, on which the wobble bearing is mounted so as to be axially displaceable, is arranged perpendicularly, with a minimum distance defined by the dimensions of the wobble bearing, relative to the longitudinal axis of the tool spindle. For this reason, driving of this drive shaft by a motor whose motor axle preferably intersects the longitudinal axis of the tool spindle can be effected only with allowance for an additional transmission stage between the motor and the drive shaft of the wobble bearing. Moreover, the greatest precision is to be required primarily at those portions intended to provide for the axial displaceability of the wobble bearing on its drive shaft with simultaneous rotational driving of the wobble bearing by the drive shaft, as a result of which the production complexity is greatly increased.

Such hand tools having an oscillatory drive have multiple applications, for instance in grinding, sawing or, alternatively, also cutting of workpieces. In such cases, usual oscillation frequencies are approximately in the range of 5000 to 25000 oscillations per minute, typical swivel angles of the tool spindle being approximately between 0.5 degree and 7 degrees.

Hand tools designed in this way are highly flexible, and are suitable for many possible applications, types of use and usable tools. Owing to their compact and light form, they enable the user to adopt a great variety of gripping or working positions in relation to the hand tool or the workpiece. It has been found, however, that the handling of such hand tools can be improved in the interest of more comfortable working. In this respect, consideration is given primarily to the weight of the hand tool and to the vibration experienced by the operator.

Known from WO 2008/128804 A1 is a further hand tool according to the type stated at the outset, which has a mass balancing device for balancing out vibrations, having a stroking mass part displaceably mounted in a guide and impinged upon by an eccentric portion of a motor shaft. The stroking mass part thereby executes a sliding motion, which is directed substantially contrary to the motion of an oscillating lever about a tool spindle.

The vibrations produced by the oscillatory drive can be reduced by means of such a mass balancing device, but the production resource requirement and the weight of the hand tool machine are consequently increased and, in addition, its susceptibility to wear can increase.

SUMMARY OF THE INVENTION

In view of this it is a first object of the invention to disclose an improved oscillatory drive that is of a simple and reliable structure.

It is a second object of the invention to disclose an oscillatory drive that can be produced with a small resource requirement.

It is a third object of the invention to disclose an oscillatory drive that offers reduced vibrations when compared with prior art designs.

According to the invention these and other objects are achieved, in the case of a hand tool according to the type stated at the outset, in that the at least one driver is held movably relative to the working spindle and engages in a circumferential region of the working spindle in order to drive the latter in a rotationally oscillating manner.

The object of the invention is thereby achieved in full. This is because the invention makes it possible to provide, between the driver and the working spindle, an appropriate connection, such as a joint or a toothing that, because of its movability, enables tolerance deviations of the components involved and the surrounding components to be balanced out. Furthermore, the engagement of the driver in a circumferential region of the working spindle ensures that force is introduced into the working spindle in a manner that is sparing of components and reduces wear, since the moment to be transmitted through the working spindle can be generated through introduction of a relatively small force in the circumferential region of the working spindle.

In this way, the component loadings can be reduced and the service life of the hand tool can be increased, while a reduction in the level of vibration affecting the operator can be realized.

In a preferred development of the invention, the hand tool has two drivers driven in opposite directions.

This measure makes it possible to prevent a one-sided loading of components. The introduction of force into the working spindle is branched, such that high local component loadings can be reduced significantly. Consequently, individual components can be significantly smaller and lighter in design.

The arrangement of two drivers driven in opposite directions can constitute an effective measure for preventing vibrations, with no need for the provision of separate mass balancing elements, since the transmission parts themselves, namely, the drivers, can achieve an effective balancing of masses.

Advantageously, a closed force characteristic can be produced through such a configuration, since the two drivers are, to a certain extent, coupled to one another by the working spindle in such a way that the to-and-fro motion is caused both by the drive motor and by the working spindle itself. It is possible to avoid complex design solutions, for example for generating a restoring motion of the drivers held so as to be movable relative to the working spindle.

According to a further design of the invention, the at least one driver is configured as a sliding joint or coupling joint.

In this way, a particularly simple mounting of the driver can be achieved, thus, for example, by means of known slide bearings in the case of a driver configured as a sliding joint or, alternatively, as spherical plain bearings in the case of a driver configured as a coupling joint. The kinematics of the drive mechanism can thereby be influenced advantageously. As is known, sliding joints, which also include turning-and-sliding joints and coupling joints, have particular translatory or rotatory degrees of freedom. A mechanism having a precisely defined degree of freedom can therefore be designed in consideration of these kinematic factors. This also makes it possible to further reduce component loadings and vibrations, and thereby improve the service life of the hand tool and the operating comfort.

In an advantageous development of the invention, the hand tool has at least one spring, which acts upon the at least one driver in the direction of the guide surface.

This measure enables a free play between the driver, the transmission means and the working spindle to be minimized or advantageously balanced. Rattling of the components is prevented, as a result of which the noise level and, generally, the vibration level can be significantly reduced. Likewise, a further minimization of component wear can be achieved through the permanent or almost permanent engagement or contact of the elements. A return of the driver in the direction of the guide surface is supported.

Within the meaning of this application, springs can be understood to include metal springs, usually compression, tension, torsion or spiral springs, but also sprung elements in another form or of other materials. These include, in particular, rubber cushions or fluidic springs. It is understood that the springing elements can also have damping properties, whether inherent in the material or effected by additional damping elements.

In an expedient development of the invention, the at least one driver is provided with a protrusion for engagement in a driving portion in the circumferential region of the working spindle.

In this way, the protrusion and the driving portion can be designed in such a way that it becomes possible for the working spindle to be driven concomitantly in both the to motion and the fro motion, i.e. when the driver is substantially subject to compression loading or to tensile loading. This driving of the working spindle can then be effected, according to the configuration of the contact portions involved, as a roller-type rolling, sliding or ball-type rolling motion, a load distribution being effected, if possible, through a flat pairing in the contact region, in order significantly to reduce the component wear through the engagement.

According to a development of this embodiment, the protrusion and the driving portion are configured as corresponding toothing parts, at least one tooth engaging in one space in the engagement of the at least one driver in the working spindle.

An engagement of the driver in the working spindle for the purpose of driving the working spindle can thus be effected in a particularly simple manner; in this case, it is possible to achieve contact ratios that, at the same time as enabling a large force to be transmitted, make it possible to limit the contact forces associated therewith.

As mentioned at the outset, hand tools having an oscillatory drive, according to the type stated at the outset, generally execute motions having a small swivel angle of approximately 0.5 degree to 7 degrees, such that only a small number of toothing parts need to be provided in the circumferential region of the working spindle and on the respective driver engaging in this circumferential region, thus, for example, three toothing pairs, particularly preferably two toothing pairs, more preferably only one toothing pair. Accordingly, the resource requirement for production of the toothing parts is reduced, although it is made possible for the working spindle to swivel about small angles by means of the remaining toothing pairings.

According to a development of this design, the corresponding toothing parts are configured as involute toothing or cycloidal toothing.

In this way, toothing processes that are suitable and advantageous for series production can be used for the production of the toothing parts. In particular, an involute toothing can be produced particularly easily by cutting, since its basic profile generally has straight flanks. Furthermore, advantageously, it is substantially insusceptible to deviations of the axial distance, such that the components and bearing points involved can be produced and mounted with greater tolerances.

In an expedient development of the invention, the protrusion is configured so as to be rotationally symmetrical about the at least one driver.

In this way, the driver can be configured as a turning-and-sliding joint. A rotation in this case has no effect on the function, since, for example, the protrusion, in the form of a circumferential tooth, remains in engagement with the driving portion on the circumferential region of the working spindle. The driver can therefore be mounted in a particularly simple and inexpensive manner, and there is no need for securing against rotation relative to the bearing points.

In an alternative design of the invention, the protrusion and the driving portion are configured as corresponding joint parts, in particular as a ball joint or revolute joint.

This measure makes it possible for the driver to be held so as to be movable relative to the working spindle, in such a way that the remaining degrees of freedom of motion can be defined in dependence on the type and shape of the joint. Thus, a ball joint generally allows swivelling or rotation about three axes, whereas a revolute joint, for instance a hinge, only allows rotation about one axis. The kinematics of the transmission mechanism can thereby also be defined in such a way that, for the mechanism as a whole, there is obtained a degree of freedom that allows an oscillation motion of the tool spindle to be generated, but is also not under-defined or over-defined, such that wear arising therefrom, or unwanted vibration or noise resulting therefrom can be prevented or limited in an effective manner.

According to a further design of the invention, the hand tool has a wobble bearing, on which the guide surface is arranged.

In this way, the rotary motion of the motor shaft can be converted particularly easily into a wobbling motion, to enable the driver to be driven. This can now be effected by means of known, easily procurable and inexpensive components.

In an advantageous development of the invention, the guide surface is coupled indirectly, via bearing elements and a transmission means, to the at least one driver, the transmission means being rotationally decoupled from the revolving guide surface.

Following the rotational decoupling, therefore, only certain components of the motion of the drive motor are transmitted to the driver via the coupling element. Consequently, the driver is acted upon primarily by components that are directed towards the latter, while rotary components of the motion of the guide surface are filtered out as far as possible. Relative motions of the guide surface relative to the transmission means can thereby be reduced in an effective manner, and the associated wear, particularly resulting from sliding pairings, is reduced.

In a preferred development of this design, the transmission means is coupled to the at least one driver via a sliding, rolling-ball or roller contact.

Through this measure, by means of appropriate materials or components for such contact pairings, for instance balls, rollers and lubricants, or appropriate surface treatment or coating methods such as, for example, case hardening or PTFE coatings, the components concerned can be made to be wear-resistant or wear-reducing. It goes without saying that rolling-ball pairings, in particular roller pairings, are preferred over mere sliding pairings.

According to a further design of the invention, the guide surface is provided on a cam.

It is thus made possible to influence the guide surface appropriately through alteration of the cam contour, for example in order to achieve continuous curvature transitions so as to reduce or prevent shock loads or pressure loads upon the revolving guide surface being coupled to the driver.

In a preferred development of this embodiment, the hand tool has two cams having an offset contour, which are each respectively coupled to a driver.

In this way, driving of two drivers in opposite direction can be achieved particularly easily. Since each cam therefore has to be designed only to act together with one driver, such an arrangement can be realized with a small structural space requirement, particularly with regard to the drivers. Preferably, the contours of the cams are identical, but offset by 180 degrees. For particular applications it is conceivable to provide two differing cam contours or, alternatively, an offset other than 180 degrees. Need for such a design could arise if particular structural space limitations or the like have to be taken into account in respect of the position of the drivers or in respect of the arrangement of the shaft carrying the offset cams. This can be the case, for example, if the two drivers and the shaft carrying the two cams are not arranged in one plane.

In an advantageous development of this design, the cam or cams is/are configured so as to be rotationally fixed on a camshaft, which can be driven by the drive motor.

This measure enables the driving of the cams by means of the camshaft to be effected particularly easily. An easily generated rotational motion is converted, through the guide surface of the cams, into a stroking motion of the drivers.

In a preferred development of this design, the camshaft can be driven by the drive motor by means of the motor shaft, the camshaft and the motor shaft being aligned parallelwise or perpendicularly in relation to one another.

In this way, it is made possible for the drive motor to be arranged appropriately relative to the cam shaft, and therefore in relation to the drivers and, ultimately, the working spindle, in order to make the hand tool compact, lightweight and ergonomic. The position of the drive motor also influences the distribution of masses and the vibration level in the hand tool, and consequently a further reduction of the vibration level can be realized through expedient arrangement.

It is understood that the above-mentioned features of the invention and those to be explained in the following can be applied, not only in the respectively specified combination, but also in other combinations or singly, without departure from the scope of the present invention.

BRIEF DESCRIPTION OF THE DRAWINGS

Further features and advantages of the invention are disclosed by the following description of a plurality of exemplary embodiments, with reference to the drawings, wherein.

DESCRIPTION OF PREFERRED EMBODIMENTS

Figure 1:
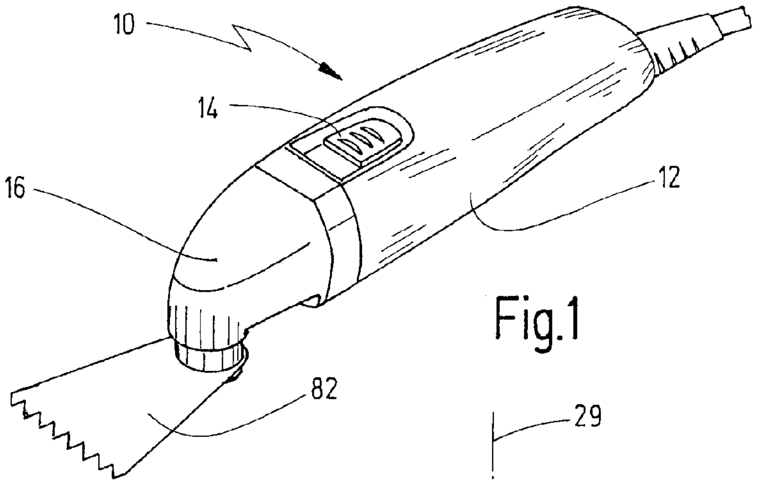
FIG. 1 shows a perspective view of a hand tool according to the invention.

FIG. 1 shows a hand tool according to the invention, denoted in its entirety by 10. Indicated in this case is a housing 12, a switch 14 for activating the hand tool 10, a gearhead 16, and a tool 82 that can be driven in a rotationally oscillating manner by the hand tool 10.

Figure 2:
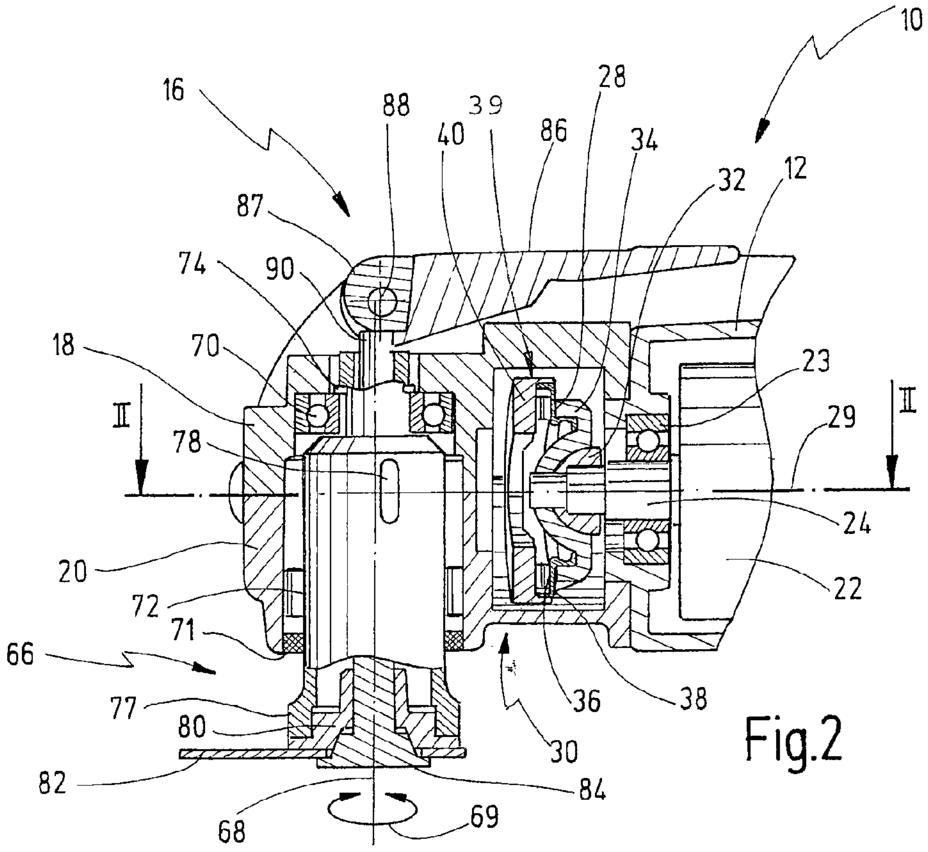
FIG. 2 shows a section through a hand tool according to the invention, in the region of its gearhead along the line I-I according to FIG. 3.
Figure 3:
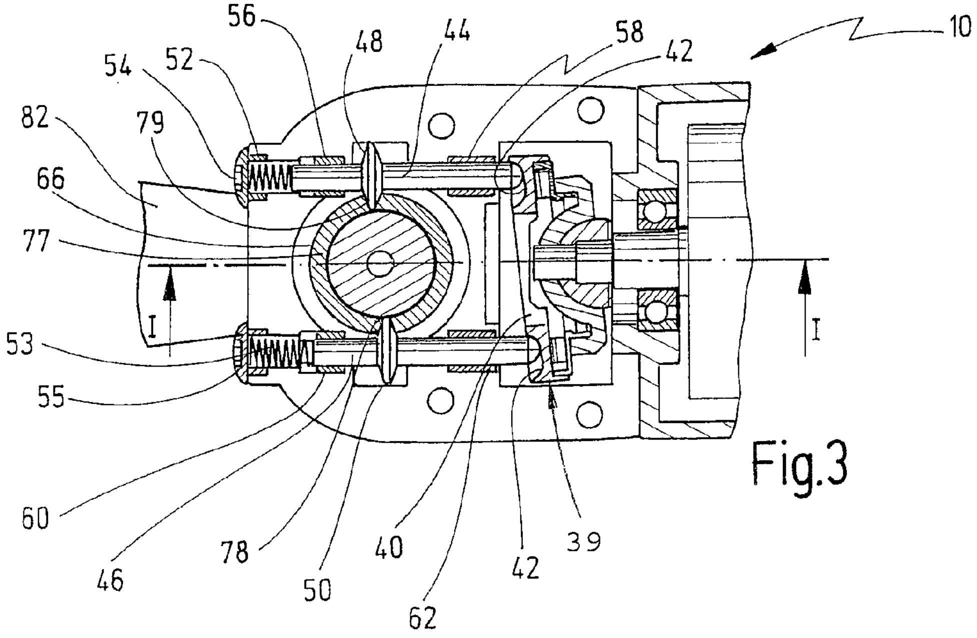
FIG. 3 shows a section through the hand tool according to FIG. 2, along the line II-II.

Represented in FIGS. 2 and 3 is such a hand tool 10 according to the invention, approximately according to the representation in FIG. 1, in section in the region of its gearhead, the structure of which is to be explained more fully in the following.

Arranged in the housing 12 is a drive motor 22 having a motor shaft 24 guided in a motor bearing 23. Flange-mounted on the tool-side end of the motor shaft 24 there is a wobble bearing, denoted as a whole by 30. In this case, a flange part 32 and a cup 34 are connected in a rotationally fixed manner, as a coupling element, to the motor shaft. This connection can be effected in a manner known in principle, for instance through pressing-on, by means of a splined-shaft connection or similar, with the aid of appropriate retaining elements, such as feather keys or snap rings.

Figure 4:
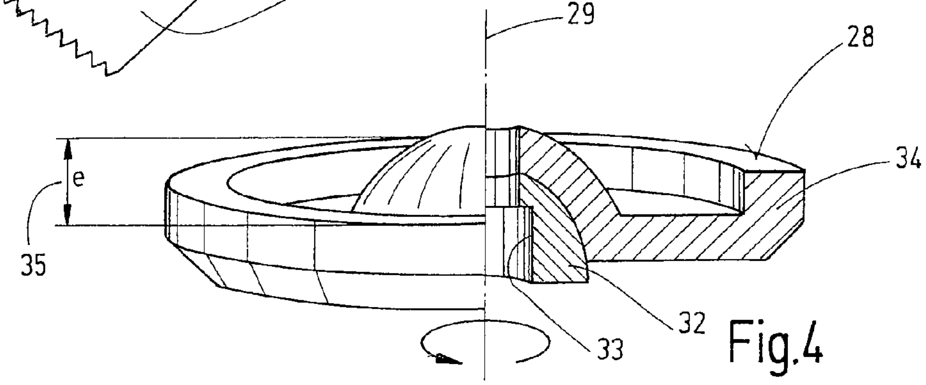
FIG. 4 shows an enlarged representation of a partial section through a coupling element in the form of a cup, for instance according to FIG. 2 or FIG. 3.

The flange part 32 and the cup 34 are additionally represented in detail (not to scale) in FIG. 4. The cup 34 has a guide surface 28 that, in revolving about the guide axis 29, which, in the design according to FIGS. 2 and 3, corresponds to the axis through the motor shaft 24, executes a wobbling motion with an offset e denoted by 35. As can be seen from FIG. 4, such a cup 34 having such a flange part 32 can be produced, advantageously, from rotationally symmetrical parts, in that the latter are tilted about an axis that is perpendicular to the guide axis 29, and an opening 33, for fastening to the motor shaft 24, is then made along the guide axis 29.

After the wobble bearing 30 has been mounted, there results an arrangement of the remaining components associated therewith, which is shown in FIGS. 2 and 3. The wobble bearing 30 is completed by bearing elements 36, a bearing cage or bearing ring 38 and a wobble element 39 arranged as a transmission means 40 having contact surfaces 42. The bearing elements 36 can be configured in a manner known in principle, as balls, rollers or cones or, alternatively, as sliding elements. The transmission means 40 is in engagement with drivers 44,46 by means of the contact surfaces 42, which are configured as recesses. Advantageously, this engagement at once constitutes an anti-rotation means of the transmission means 40 in relation to the cup 34, whereby a rotational decoupling of the wobble element 39 embodied by the transmission means 40 is realized.

As can be seen from FIGS. 2 and 3, the drivers 44, 46 are accommodated, so as to be displaceable via bearing points 56, 58, 60 and 62, by an upper transmission housing 18 and a lower transmission housing 20. A displacement of the drivers 44, 46 along their longitudinal direction is delimited by the contact surfaces 42 of the transmission means 40 and, moreover, springs 52, 53, which are held in the transmission housing 18, 20 by plug elements 54, 55, exert a force, in the direction of the contact surfaces 42, upon the end of the drivers 44, 46 that faces away from the transmission means 40. There thus results an alignment of the drivers 44, 46 in the gearhead 16 that is without play and determined by the position of the wobble bearing 32.

The drivers 44, 46 are provided with rotationally symmetrical protrusions 48, 50 that engage in corresponding driving portions 78, 79 in the circumferential region of a spindle tube 77 of a working spindle 66. The forced coupling of the drivers 44, 46 with the wobble bearing 30 results in a longitudinal oscillation of the drivers 44, 46 in opposite directions. The stroke of this longitudinal oscillation corresponds substantially to the offset e, numeral 35 according to FIG. 4, in the revolution of the cup 34 of the wobble bearing 30. During this longitudinal oscillation, the protrusions 48, 50, here configured as circumferential gear teeth, effect driving of the working spindle 66 through engagement in the driving portions 78, 79, which are configured as tooth spaces. The resultant gearing ratios thus correspond substantially to those of a gearing stage composed of a gear rack and a gear wheel. The difference is that, owing to the smallness of the required swivel angle of the working spindle 69, mentioned previously, only one tooth meshes with one space.

In the exemplary embodiment shown, according to FIGS. 2 and 3, the drivers 44, 46 are fully or substantially rotationally symmetrical in form. The bearings 56, 58, 60 and 62 can therefore be kept particularly simple, and no measures are required to secure the drivers 44, 46 against rotation.

As can be seen from FIG. 3, the protrusions 48 and 50 engage in driving portions 78, 79 of the working spindle 66 that are exactly opposite one another. The drivers 44, 46, during their longitudinal oscillations, always execute a motion in exactly opposite directions. Their inertial forces can therefore be compensated to a large extent, such that the rotational oscillation, denoted by the double arrow 69 in FIG. 2, of the working spindle 66 about its longitudinal axis 68 can be generated, according to the present invention, with a significantly reduced level of vibration.

Further essential parts of the hand tool 10 according to the invention are represented in FIG. 2. The working spindle 66 is mounted by means of spindle bearings 70, 72 in the gearhead 16 that comprises the transmission housings 18, 20, and is held axially by means of a retaining ring 74. Further, a sealing ring 71 is provided at the tool-side outlet of the working spindle 66 from the gearhead 16. Additionally associated with the working spindle 66 are the spindle tube 77, and a receptacle 80 for receiving the tool 82, which is held on the latter by means of a clamping element 84.

The actuation of the tool chucking device is effected in the manner known in principle from WO 2005/102605 A1, by means of a chucking lever 86 that can be swivelled about a swivel pin 88. The chucking lever 86 has an eccentric face 87, which, upon being swivelled, acts together with a pressure piece 90. Upon the chucking lever 86 being swivelled over, the pressure piece 90 is then displaced in the direction of the tool 82 in such a way that a spring tensioning device, not represented in greater detail here, is released, enabling the clamping element 84 to be released to enable the tool 82 to be removed from the receptacle 80.

Figure 5:
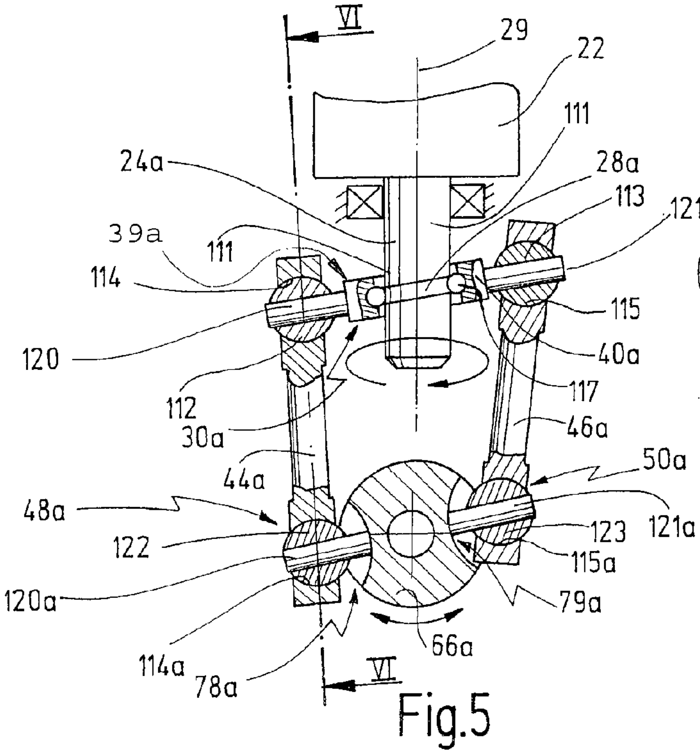
FIG. 5 shows a schematic representation of an oscillation trans-mission of an alternative embodiment of a hand tool according to the invention.

FIG. 5 shows an embodiment of a hand tool according to the invention that has been modified in comparison with FIGS. 2 and 3. Provided in this case is a wobble bearing 30*a* that, upon being driven by a motor 22, causes a wobble element 39*a* embodied by a transmission element 40*a*, having flange parts 120,121, to execute a path motion about a guide axis 29, which path motion is explained more fully in relation to FIG. 10. Their motion is transmitted to drivers 44*a*, 46*a* via joint parts 112,113 that are guided in receptacles 114, 115 of said drivers. In the present case, the joint parts 112,113 are configured as ball joints, and therefore enable the drivers 44*a*, 46*a* to be swivelled in any spatial directions relative to the flange parts 120,121. Such an indeterminate relative motion is delimited through appropriate structural design of the protrusions 48*a*, 50*a* on the circumferential region of the working spindle 66*a*, such that, ultimately, a guided coupled motion of the working spindle 66*a* in the form of a rotational oscillation can be effected by the wobble bearing 30*a*.

Figure 6:
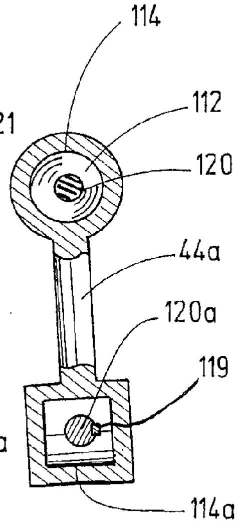
FIG. 6 shows a partial section through the hand tool according to FIG. 5, along the line VI-VI.

In the present case, the protrusions 48*a*, 50*a* are configured as pivot bearings, for instance in the form of hinges. For this purpose, cylinder parts 122, 123 are arranged in assigned cylindrical receptacles 114*a*, 115*a*, cf. also FIG. 6. These cylinder parts 122, 123 are secured against rotation relative to the flange parts 120*a*, 121*a* assigned to the driver portions 79*a*, 79*b* of the working spindle 66*a*, for instance according to the anti-rotation means denoted by 119 in FIG. 6. The motion of the drivers 44*a*, 46*a* is thus defined in such a way that it can be effected only in a plane spanned by the drivers 44*a*, 46*a* and the guide axis 29, as in FIG. 5.

Figure 7:
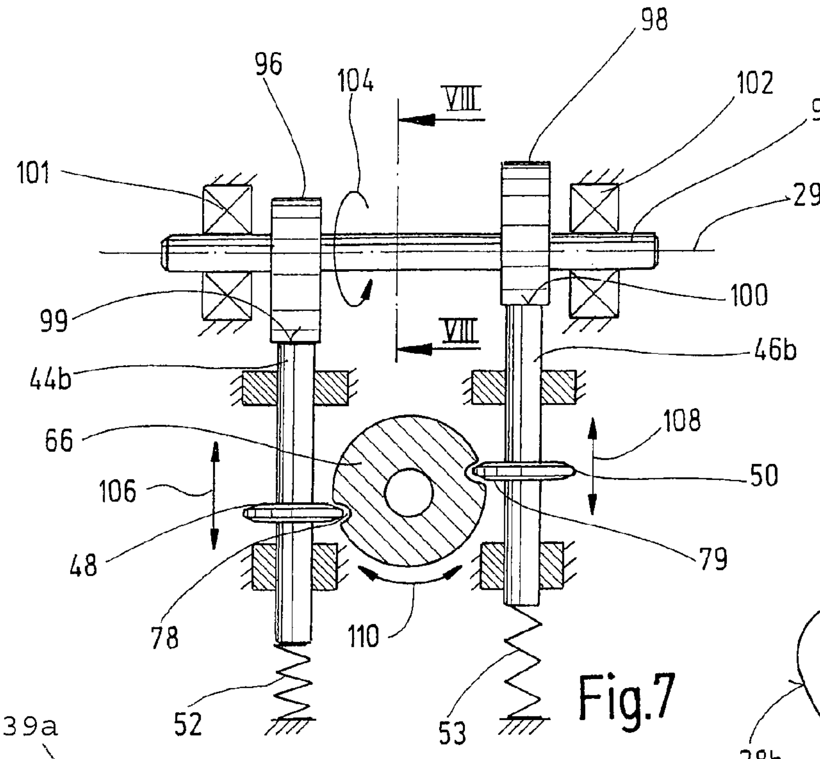
FIG. 7 shows a schematic representation of an oscillation trans-mission of a further alternative embodiment of a hand tool according to the invention.
Figure 8:
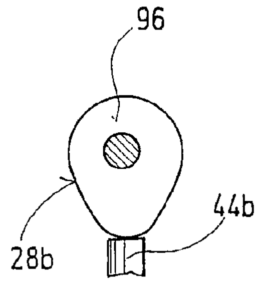
FIG. 8 shows a partial section through the hand tool according to FIG. 7, along the line VIII-VIII in the region of a cam.

A further, alternative embodiment of an oscillatory drive of a hand tool according to the invention is shown in FIGS. 7 and 8. A camshaft 94 rotationally drives a coupling element, in the form of cams 96 and 98, that is connected to the camshaft in a rotationally fixed manner. The camshaft can be driven directly or indirectly by a drive motor, by means of a transmission stage, in a known manner (not represented in FIG. 7). The position of the drive motor relative to the tool spindle 66 can be determined, in order to achieve suitable ergonomic and structural space conditions for handling, for instance, through appropriate selection of this transmission state. The camshaft 84 is guided in bearing points 101, 102.

Such a transmission stage can be configured, in particular, as a spur gearing, bevel gearing or worm gearing. The toothing in this case is to be configured as a spur toothing, helical toothing, spiral toothing or herringbone toothing, in dependence on design criteria such as load capacity, bearing load, prevention of running noise, contact ratios, producibility and service life.

Arranged on the circumference of the cams 96, 98 is a respective guide surface, for instance as shown in FIG. 8 and denoted by 28*b*. In revolving about the camshaft 94, indicated by the arrow denoted by 104, the cams 96, 98, by means of their guide surface 28*b*, slide along transmission elements 99, 100, configured as slide surfaces, on the front sides of drivers 44*b*, 46*b*. These slide pairings can be designed to be wear resistant, through appropriate design of the material and surface. Alternatively, it is conceivable for the drivers 44*b*, 46*b* to be configured, for example, as roller tappets or ball tappets, such that, instead of a sliding relative motion, roller-type or ball-type rolling motions that, in principle, are more wear resistant, occur between the cams 96, 98 and the drivers 44*b*, 46*b*.

Similar to the embodiment shown in FIGS. 2 and 3, in the case of the embodiment according to FIG. 7, likewise, springs 52, 53 act upon the drivers 44*b*, 46*b* in the direction of the guide surfaces 28*b*. In this way tolerances are equalized and rattling is prevented, and vibration and noise generation can be minimized.

As stated above, it is expressly conceivable for the springs 52, 53 of the represented embodiments of the invention to be provided as fluidic springs or, alternatively, as metal springs having additional damping or friction elements, to enable component loads and vibrations to be reduced yet more effectively through an appropriate spring and damper combination.

The revolving of the cams 96, 98 causes the drivers 44*b*, 46*b* to assume longitudinally oscillating motions in opposing directions, denoted by double arrows 106, 108. The engagement of protrusions 48, 50, provided on the drivers 44*b*, 46*b*, in corresponding driving portions 78, 79 on the working spindle 66, for the purpose of effecting a rotational oscillating motion, indicated by the double arrow 110, is effected in a manner similar to that of the explanations relating to FIG. 3.

Figure 10:
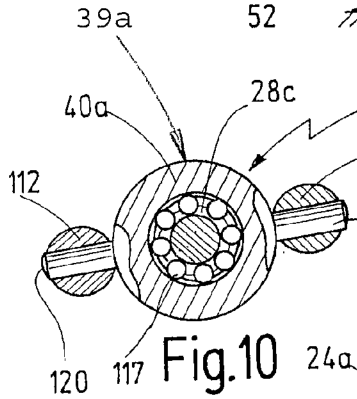
FIG. 10 shows a partial section through the hand tool according to FIG. 9, along the line X-X in the region of a wobble bearing.
Figure 9:
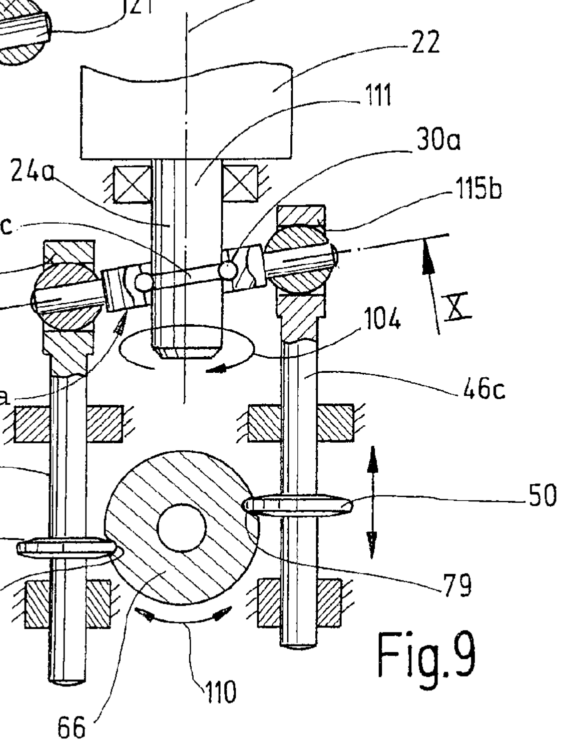
FIG. 9 shows a schematic representation of an oscillation trans-mission of a further alternative embodiment of a hand tool according to the invention.

A further, alternative embodiment of a hand tool according to the invention is now represented in FIGS. 9 and 10, wherein here, likewise, the engagement of protrusions 48, 50 in driving portions 78, 79 of a working spindle 66 that correspond to these protrusions is effected, to a very large extent, according to the explanations relating to FIG. 3 and FIG. 7.

The oscillatory drive has a wobble bearing, known in principle from FIG. 5, which is represented in section in FIG. 10 and which is to be explained more fully in the following. A guide face 28*c* is arranged directly on a coupling element 111 that, in the present case, coincides with a motor shaft 24*a*. It is to be noted in this case that the guide face 28*c* has a circular cross-section along the plane of intersection indicated by the arrows X-X in FIG. 9, i.e. at an angle relative to the guide axis 29. Accordingly, in the present case, the motor shaft 24*a* coincides with a coupling element 111 having the guide surface 28*c*.

In a manner known in principle, the wobble bearing 30*a* can also be configured as a separate hub part, in which case the guide surface would be arranged on a bearing inner ring, which would have to be connected to the motor shaft.

Driver elements 44*c*, 46*c* are again configured as sliding elements, such that a wobble element 39*a* embodied by a transmission means 40*a* in the form of a bearing outer ring is rotationally decoupled from the guide surface 28*c* via circumferential bearing elements 117. The drivers 44*c*, 46*c* have, at their motor-side end, receptacles 1146, 1156, to which there are assigned joint parts 112, 113 connected to flange parts 120,121, which are connected to the transmission means 40*a*. Since the receptacles 114,1156 then provide for a positional orientation of the joint parts 112,113 in both the compression direction and the tensile direction, a positive coupled motion is provided in the case of this design, such that there is no need for additional spring elements that would act upon the drivers 44*c*, 46*c* in the direction of the guide surface 28*c*.

It has been achieved, within the scope of the invention, to specify an improved oscillatory drive that, in addition to a simple structure, opens up further possibilities for reducing weight, for example through branched force transmission, for minimizing noise, for instance through force-contingent forced coupling to active surfaces, and for reducing vibration, for example through drivers moving in opposite directions. Through these measures, oscillation tools can be made easier to handle and their operating comfort can be further improved.

What is claimed is:

1. A hand tool machine comprising:

a housing;

a drive motor arranged within said housing;

a motor shaft driven rotatingly by said drive motor;

a working spindle received within said housing and having a receptacle configured for receiving a tool; and an oscillatory drive gear driven by said motor shaft configured for oscillatingly driving said working spindle about a longitudinal axis thereof;

said oscillatory drive gear comprising:

a wobble bearing arranged on said motor shaft, said wobble bearing comprising a coupling element having a closed guide surface revolving around said motor shaft;

at least a first driver guided for translatory movement;

wherein said first driver at one end thereof engages said closed guide surface of said coupling element; and said first driver engages said working spindle at a circumferential region thereof for oscillatingly rotating said working spindle about a longitudinal axis thereof when said first driver is moved back and forth by said coupling element.

2. The hand tool machine according to claim 1, further comprising a second driver guided for translatory movement; wherein said second driver at one end thereof engages said closed guide surface of said coupling element;

said second driver engages said working spindle at a circumferential region thereof; and said first and second drivers are driven back and forth by said coupling element in opposite directions.

3. The hand tool machine according to claim 1, wherein each driver is configured as a sliding joint or coupling joint.

4. The hand tool machine according to claim 1, wherein each driver is biased against said guide surface of said coupling element.

5. The hand tool machine according to claim 2, further comprising first and second springs for biasing said drivers against said guide surface of said coupling element.

6. The hand tool machine according to claim 1, wherein each driver comprises a protrusion configured for engaging a driving portion provided in the circumferential region of said working spindle.

7. The hand tool machine according to claim 6, wherein said protrusion and said driving portion are configured as corresponding toothing parts engaging each other.

8. The hand tool machine according to claim 7, wherein the corresponding toothing parts are configured as involute toothing or cycloidal toothing.

9. The hand tool machine according to claim 6, wherein said protrusion is configured rotationally symmetrical about said driver.

10. The hand tool machine according to claim 6, wherein said protrusion and said driving portion are configured as corresponding joint parts.

11. A hand tool machine comprising:

a housing;

a drive motor arranged within said housing;

a motor shaft driven rotatingly by said drive motor;

a working spindle received within said housing and having a receptacle configured for receiving a tool; and an oscillatory drive gear driven by said motor shaft configured for oscillatingly driving said working spindle about a longitudinal axis thereof;

said oscillatory drive gear comprising:

a wobbling element arranged on said motor shaft, said wobbling element being rotationally decoupled from said motor shaft; and a driver engaging said wobbling element and engaging a circumferential region of said working spindle for oscillatingly rotating said working spindle about a longitudinal axis thereof when said motor shaft rotates.

12. The hand tool machine of claim 11, further comprising:

a second driver engaging said wobbling element and engaging a circumferential region of said working spindle for oscillatingly rotating said working spindle about a longitudinal axis thereof when said motor shaft rotates;

said wobbling element comprising a wobble bearing arranged on said motor shaft and having an outer ring;

said driver and second driver each having a first end being hinged to said outer ring; and said driver and second driver oscillatingly rotating said working spindle when said driver and second driver are moved by said outer ring of said wobble bearing.

13. The hand tool machine of claim 12, further comprising:

first and second flange parts arranged on said working spindle;

each of said first and second flange parts being hingedly connected to one of said driver and second driver.

14. The hand tool machine of claim 12, wherein at least one of said drivers is hingedly connected to said outer ring via a sliding, rolling-ball or roller contact.

* * * * *